US012684359B2

(12) United States Patent (10) Patent No.: US 12,684,359 B2
Min et al. (45) Date of Patent: Jul. 14, 2026

(54) METHOD AND APPARATUS FOR DISTRIBUTING LAYERS OF MULTI-INPUT MULTI-OUTPUT SYSTEM IN BASE STATION OF WIRELESS COMMUNICATION SYSTEM

(71) Applicant: SAMSUNG ELECTRONICS CO., LTD., Suwon-si (KR)

(72) Inventors: Byoungyoon Min, Suwon-si (KR); Hyoyol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 18/199,736

(22) Filed: May 19, 2023

(65) Prior Publication Data

US 2023/0308883 A1 Sep. 28, 2023

Related U.S. Application Data

(63) Continuation of application No. PCT/KR2021/012237, filed on Sep. 8, 2021.

(30) Foreign Application Priority Data

Nov. 20, 2020 (KR) ........................ 10-2020-0157166

(51) Int. Cl.
$H04W\ 16/10$ (2009.01)
$H04B\ 7/0413$ (2017.01)
$H04W\ 72/1273$ (2023.01)
(52) U.S. Cl.
CPC .......... *H04W 16/10* (2013.01); *H04B 7/0413* (2013.01); *H04W 72/1273* (2013.01)

(58) Field of Classification Search
CPC . H04W 16/10; H04W 72/1273; H04B 7/0413
See application file for complete search history.

(56) References Cited

U.S. PATENT DOCUMENTS

| | | | |
|---|---|---|---|
| 7,907,677 B2 | 3/2011 | Li et al. | |
| 8,271,043 B2 * | 9/2012 | Kim ..................... | H04B 7/0632 |
| | | | 455/562.1 |

(Continued)

FOREIGN PATENT DOCUMENTS

| | | |
|---|---|---|
| KR | 10-2009-0123154 A | 12/2009 |
| KR | 10-2012-0129245 A | 11/2012 |

(Continued)

OTHER PUBLICATIONS

WO-2017131268-A1-Translated (Year: 2017).*

(Continued)

*Primary Examiner* — Yemane Mesfin
*Assistant Examiner* — Jia Hao Deng
(74) *Attorney, Agent, or Firm* — Sughrue Mion, PLLC

(57) ABSTRACT

Provided is a method for distributing a layer of multi-input multi-output (MIMO) system in a base station of a wireless communication system, the method including obtaining scheduling information for each of a plurality of cells, calculating a number of layers required for each cell using the obtained scheduling information and a predetermined layer metric, allocating a layer and a modem resource corresponding to the calculated the number of layers for each cell, and performing downlink scheduling using the allocated resources.

17 Claims, 9 Drawing Sheets

(56) References Cited

U.S. PATENT DOCUMENTS

| | | |
|---|---|---|
| 8,917,614 B2 | 12/2014 | Luo et al. |
| 9,049,739 B2 | 6/2015 | Jo et al. |
| 9,462,599 B2 | 10/2016 | Gao et al. |
| 10,244,472 B2 | 3/2019 | Fazel Sarjoui et al. |
| 10,321,323 B2 | 6/2019 | Fujii |
| 10,375,677 B2 | 8/2019 | Zhang et al. |
| 11,128,352 B2 | 9/2021 | Lorca Hernando et al. |
| 2009/0291702 A1 | 11/2009 | Imai et al. |
| 2012/0052896 A1 | 3/2012 | Li et al. |
| 2012/0224554 A1 | 9/2012 | Park |
| 2014/0112287 A1 | 4/2014 | Chun et al. |
| 2015/0036624 A1 | 2/2015 | Fujishima et al. |
| 2015/0304997 A1 | 10/2015 | Park et al. |
| 2016/0241374 A1 | 8/2016 | Seo et al. |
| 2018/0234146 A1 | 8/2018 | Onggosanusi et al. |
| 2019/0174563 A1 | 6/2019 | Dowlatkhah et al. |
| 2020/0052840 A1 | 2/2020 | Hasegawa et al. |
| 2020/0119776 A1 | 4/2020 | Lorca Hernando et al. |
| 2020/0221473 A1 | 7/2020 | Krishnaswamy et al. |

FOREIGN PATENT DOCUMENTS

| | | | | |
|---|---|---|---|---|
| KR | 10-1577518 B1 | 12/2015 | | |
| KR | 10-1812431 B1 | 12/2017 | | |
| KR | 10-2018-0112867 A | 10/2018 | | |
| KR | 10-2019-0094726 A | 8/2019 | | |
| WO | 2014/157939 A1 | 10/2014 | | |
| WO | WO-2017131268 A1 * | 8/2017 | .......... | H04B 7/0602 |

OTHER PUBLICATIONS

International Search Report (PCT/ISA/210) issued Dec. 15, 2021 by the International Searching Authority in counterpart International Patent Application No. PCT/KR2021/012237.

Written Opinion (PCT/ISA/237) issued Dec. 15, 2021 by the International Searching Authority in counterpart International Patent Application No. PCT/KR2021/012237.

* cited by examiner

METHOD AND APPARATUS FOR DISTRIBUTING LAYERS OF MULTI-INPUT MULTI-OUTPUT SYSTEM IN BASE STATION OF WIRELESS COMMUNICATION SYSTEM

CROSS REFERENCE TO RELATED APPLICATIONS

This application is a continuation of PCT/KR2021/012237 filed on Sep. 8, 2021 in the Korean Intellectual Property Office (KIPO) and claims priority to patent application number 10-2020-0157166 filed on Nov. 20, 2020 in KIPO; the above applications are hereby incorporated by reference.

FIELD

The following descriptions relate to a method and an apparatus for distributing layer of multi-input multi-output (MIMO) in a base station of a wireless communication system.

BACKGROUND

An Effort is being made to develop an improved 5G (5th generation) communication system or a pre-5G communication system in order to meet the increasing demand for wireless data traffic after the commercialization of a 4G (4th generation) communication system. For this reason, the 5G communication system or the pre-5G communication system is called a communication system after the 4G network (Beyond 4G Network) or system after the LTE system (Post LTE).

In order to achieve a high data rate, the 5G communication system is being considered for implementation in a super high frequency (mmWave) band (e.g., such as a 60 giga (60 GHz) band). In order to alleviate the path loss of radio waves in the super high frequency band and increase the transmission distance of radio waves, in the 5G communication system, beamforming, massive MIMO, Full Dimensional MIMO (FD-MIMO), array antenna, analog beam-forming, and large scale antenna technologies are being discussed.

In addition, in order to improve the network of the system, in the 5G communication system, technologies such as evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, and the like are being developed.

In addition, in 5G system, an Advanced Coding Modulation (ACM) method such as Hybrid FSK and QAM Modulation (FQAM) and Sliding Window Superposition Coding (SWSC), and an advanced connection technology such as Filter Bank Multi Carrier (FBMC), non-orthogonal multiple access (NOMA), sparse code multiple access (SCMA), and the like are being developed.

Meanwhile, a mobile communication system have been developed mainly to increase the speed of data communication from a third generation mobile communication system, and the number of antennas used in a base station is increasing as it evolves into a fourth generation (4G) mobile communication system and/or a fifth generation (5G) mobile communication system. The reason why the base station of the advanced mobile communication system uses many antennas is to use the MIMO scheme between the base station and the terminal. The MIMO system of the base station may transmit data by using a layer used between the base station and the terminal.

In case of increasing the layer used between base stations and terminals using the MIMO system, the complexity increases due to the exponential multiplication of the total sum of the layer in the modem of the base station. The modem of the base station has a certain limit of processing capacity. In order to increase the processing capacity of the modem of the base station to meet this requirement, the base station must have more modems or a more highly efficient modem must be applied. This increases the cost of the mobile communication service provider for managing the base station, and eventually increases the burden of communication fees on users.

SUMMARY

The present disclosure provides a method and an apparatus for distributing a layer of an MIMO system in a base station of a mobile communication system.

The present disclosure provides a method and an apparatus for increasing processing capacity through efficient layer distribution without increasing the modem processing capacity of a base station of a mobile communication system.

The present disclosure provides a method and an apparatus for distributing a layer of MIMO systems to reduce the burden of communication fees for mobile communication service providers and/or mobile communication users.

According to an embodiment of the present invention, a method for distributing a layer of multi-input multi-output (MIMO) system in a base station of a wireless communication system, the method may comprise obtaining scheduling information for each of a plurality of cells, calculating a number of layers required for each cell using the obtained scheduling information and a predetermined layer metric, allocating a layer and a modem resource corresponding to the calculated the number of layers for each cell, and performing downlink scheduling using the allocated resources.

According to an embodiment of the present invention, a base station may comprise a plurality of cell processing units including a multiple input multiple output (MIMO) antenna and a cell scheduler, a modem, and a central scheduler.

The central scheduler may be configured to:
obtain, scheduling information for each of the plurality of cells, calculate, a number of layers required for each of the plurality of cells using the obtained scheduling information and a predetermined layer metric, allocate, a layer and a modem resource corresponding to the calculated the number of layers for each of the plurality of cell, and transmit, information on the allocated resource to the cell scheduler included in the plurality of cell processing units.

The each of the cell scheduler may be configured to:
perform, scheduling to each UE based on resource information received from the central scheduler.

According to the present disclosure, when the base station operates the MIMO system, it is possible to derive more optimized MIMO performance according to an actual wireless environment and resource utilization in the scheduler. In addition, the maximum number of MIMO scheduling layers per cell in the base station and the number of cells that can be expanded may be limited depending on the processing capacity of a modem in the base station, but the present disclosure can overcome this limitation. In other words, it is possible to efficiently service more MIMO terminals and maximize base station performance by reflecting the wireless environment that changes instantaneously while increasing the number of cells that can be extended in the base station.

According to the present disclosure, a larger number of terminals may be adaptively determined and serviced without a separate handover procedure, by maximizing the advantage of abundant layers of the MIMO system of 4G and 5G base stations. For example, in case of allocating more MIMO layer to that cell when a terminal's traffic load is biased to one side, since a procedure such as performing frequent handover between cells of a certain number of terminals is unnecessary in order to lower the load of the corresponding cell, it can be effective for stability of the mobile communication system.

DETAILED DESCRIPTION

Figure 1:
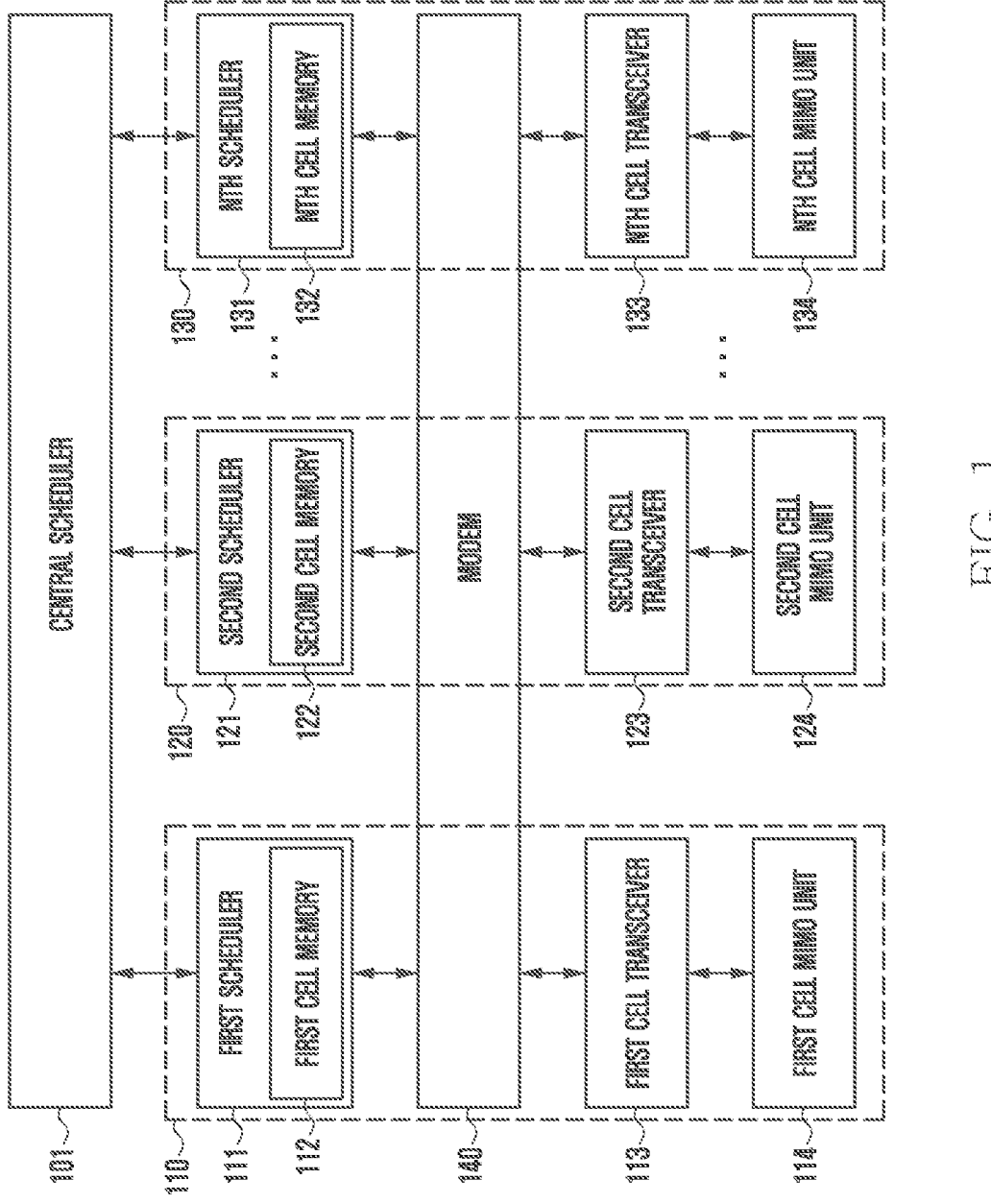
FIG. 1 is a conceptual block diagram of a wireless communication system in a base station according to the present invention.

Hereinafter, embodiments of the present disclosure will be described in detail with accompanying drawings. In this case, it should be noted that the same components in the accompanying drawings are indicated by the same reference numerals as possible. It should also be noted that the drawings of this invention attached below are provided to aid understanding of this invention, and this invention is not limited to the shape or arrangement illustrated in the drawings of this invention. In describing the present disclosure, in case that it is determined that a detailed description of a related known function or configuration may unnecessarily obscure the gist of the present disclosure, the detailed description thereof will be omitted. In the following description, only parts required to understand operations according to various embodiments will be described, and other descriptions will be omitted so as not to scatter the gist of the present invention.

FIG. 1 is a conceptual block diagram of a wireless communication system in a base station according to the present invention.

Referring to FIG. 1, it is illustrated that a base station device includes a central scheduler 101, processing units for each cell (110, 120, . . . 130) and a modem 140.

According to a preferred embodiment of the present disclosure, the central scheduler 101 may be implemented with at least one or more processors, included in at least a part of a processor that controls the entire operation of the base station, or may include a processor that controls the entire operation of the base station. The central scheduler 101 may control schedulers (111, 121, . . . and 131) for each cell in a base station to be described below, and perform control of the processing units (110, 120, . . . , 130) and the modem 140 for each cell if necessary. The operation of the central scheduler 101 according to the present disclosure will be described in more detail with reference to the drawings described below.

According to a preferred embodiment of the present disclosure, each of the cell processing units may have the same configuration. For example, the first cell processing unit 110 may include a first cell scheduler 111, a first cell memory 112, a modem 140, a first cell transceiver 113, and a first cell MIMO unit 114. In addition, the second cell processing unit 120 may include a second cell scheduler 121, a second cell memory 122, a modem 140, a second cell transceiver 123, and a second cell MIMO unit 124. Likewise, the Nth cell processing unit 130 may include an Nth cell scheduler 131, an Nth cell memory 132, a modem 140, an Nth cell transceiver 133, and an Nth cell MIMO unit 134.

A configuration of the first cell processing unit 110 among the configurations of the cell processing units (110, 120, . . . , 130) will be described as an example. The first cell scheduler 111 of the first cell processing unit 110 may perform scheduling control for communication with user equipment (UE, not shown in FIG. 1) included in a specific cell (hereinafter, a first cell). In addition, the first cell scheduler 111 may manage the number of UEs located in the first cell (or communicating or waiting to communicate in idle state), the number of UEs currently communicating in the first cell, the resources allocated to the UE currently communicating, signal quality information and/or channel information for resources allocated to the UE currently in communication. In the following description, the information described above is referred to as scheduling information. The first cell scheduler 111 may control the first cell memory 112 to store the scheduling information. In addition, when the scheduling information stored from the central scheduler 101 is requested, the first cell scheduler 111 may read it from the first cell memory 112 and provide it to the central scheduler 101.

In FIG. 1, the first scheduler 111 is described in a form in which the first cell memory 112 is included, but this is described to be distinguished for ease of understanding. In an actual implementation, a predetermined area of the memory provided inside the base station may be allocated to the first cell memory. In case that the first cell memory 112 is allocated and uses a predetermined area of the memory, the central scheduler 101 may directly read scheduling information from an area of the first cell memory 111 in the memory without obtaining scheduling information of the first cell from the first cell scheduler 111.

In addition, the central cell scheduler 101 may allocate the modem 140 or resources of the modem 140 to each the cell processing units (110, 120, . . . , 130). Accordingly, the first cell scheduler 111 may perform data processing by using the resource of the modem allocated to the first cell in the modem 140 during scheduling. For example, the first cell scheduler 111 may control (or use) resources of the modem based on the information on the maximum number of layers that can be supported for MU (multi-user)-MIMO, SU (single-user)-MIMO, the number of UEs, and the transmission rate that requires guarantees, and the like.

The modem 140 may process data to be transmitted and received under the control of each of the cell schedulers (111, 121, . . . , 131) and output the data to the corresponding transceivers (113, 123, . . . 133). For example, in the case of data requested to be transmitted through the downlink by the first cell scheduler 111, the modem 140 may encode and modulate the corresponding data and output the data to the first transceiver 113. In addition, the modem 140 may demodulate and decode data received from the first transceiver 113 through the uplink and provide the data to the first cell scheduler 111, or output the data through a corresponding user path (not separately illustrated in FIG. 1).

The first cell transceiver 113 may up-convert the encoded and modulated symbols processed by the modem 140 according to the downlink band, perform processing for MIMO transmission, and provide them to the first cell MIMO unit 114. In addition, the first cell transceiver 113 may receive a signal received from the first cell MIMO unit 114 to uplink for each layer, and perform band-down conversion for each layer and provide the signal to the modem 140.

The first cell MIMO unit 114 may include massive multiple input multiple output (MIMO) antennas, and each element of the massive MIMO antenna may be implemented as at least one radiator. In addition, the first cell MIMO unit 114 may include a low noise amplifier for processing a received signal and a power amplifier for signal transmission.

In the above, the first cell processing unit 110 has been described, and since the second cell processing unit 120 and the Nth cell processing unit 130 have the same configuration, repeated descriptions of the same contents will be omitted. However, the resources of the modem 140 for each of the first cell processing unit 110, the second cell processing unit 120, and the Nth cell processing unit 130 may be set the same or differently depending on the load for each cell, the coverage of the cell, and the number of UEs in the cell.

Meanwhile, in FIG. 1, the central scheduler 101 and each of the cell schedulers 111, 121, and 131 are divided into different blocks and illustrated. In the actual implementation as illustrated in FIG. 1, the central scheduler 101 and each of the cell scheduler 111, 121, and 131 may be implemented to be identified from each other, and may be driven according to each function within a chip when configured with a single chip including a plurality of processors. In FIG. 1, the cell schedulers 111, 121, and 131 control one cell. However, one cell scheduler may perform control on two or more cells. For example, the first cell scheduler 111 may control the first cell and the fourth cell. Similarly, the second cell scheduler 121 may control the second cell, the fifth cell, and the sixth cell. Hereinafter, for convenience of description, it will be described assuming a case where one cell scheduler manages one cell.

Then, based on the above configuration, the central scheduler 101 may determine whether layer sharing and distribution or pooling is required in the shape of the corresponding base station, by reflecting the maximum supportable layer number of MU-MIMO/SU-MIMO, whether MU scheduling is operated, and scheduling operation priority set for each cell of the base station.

For example, if the processing capacity limit in the base station is not exceeded even when the maximum MIMO operation setting value for each cell is considered, the central scheduler 101 may not perform layer sharing and distribution operations according to the present disclosure. Accordingly, the central scheduler 101 may control not to perform unnecessary operations.

As another example, if the processing capacity in the base station is exceeded when considering the maximum MIMO operation setting value for each cell, the central scheduler 101 may be set to perform layer sharing and distribution. The central scheduler 101 may adaptively reflect the instantaneously changing MIMO scheduling and wireless environment for at least one of the cell schedulers 111, 121, 131 and adjust the processing capacity in the base station not to exceed it.

As another example, the central scheduler 101 may be set to perform layer sharing and distribution even when performing adaptive processing suitable for the actual traffic condition or current status of each cell without wasting resource share/utilization, in case that the processing capacity limit in the base station is not exceeded, even if the maximum MIMO operation setting value for each cell is considered.

Figure 2:
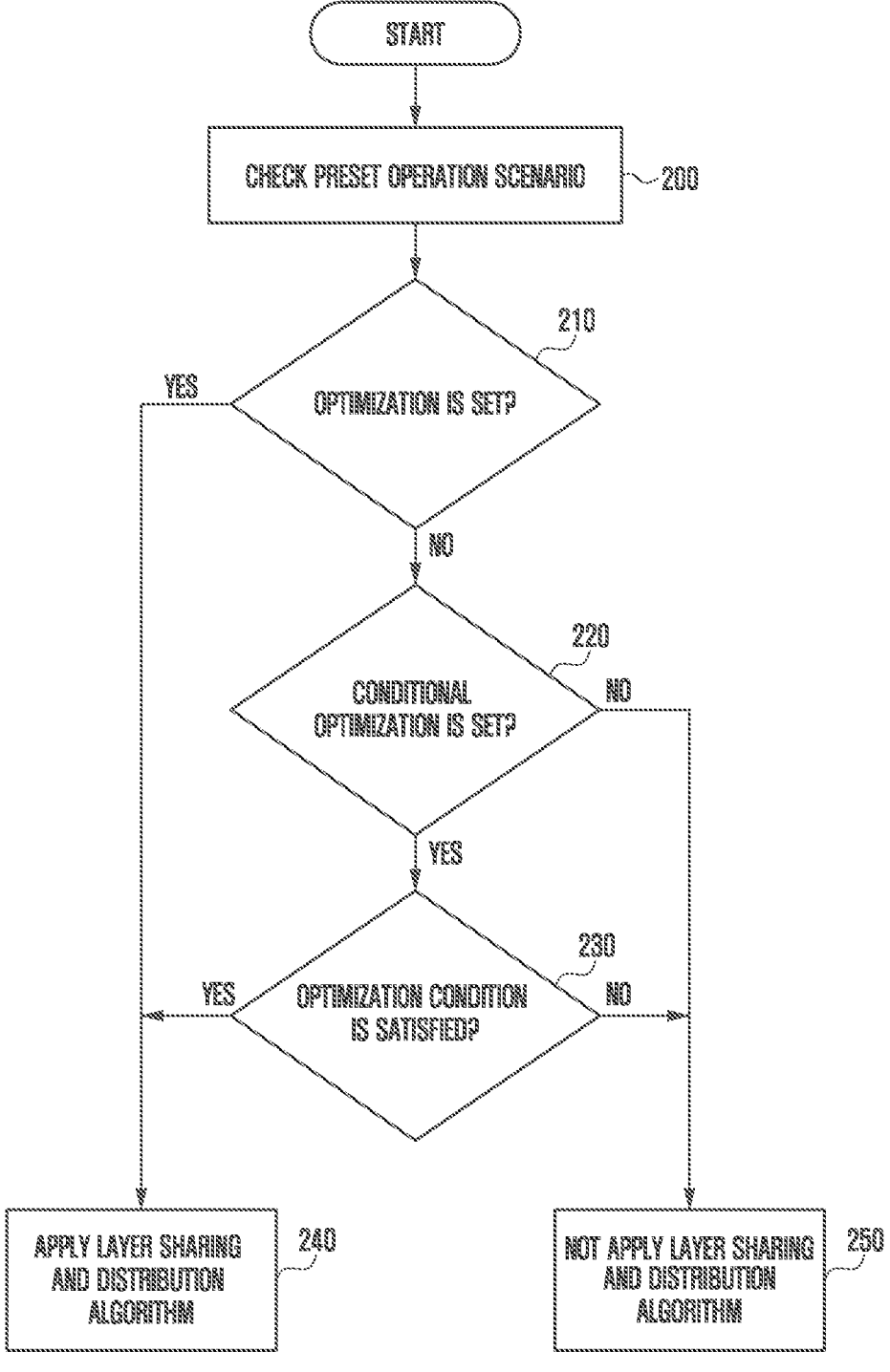
FIG. 2 is a flowchart for identifying application of a layer sharing and distribution algorithm of a MIMO system in a base station, according to an embodiment.

FIG. 2 is a flowchart for identifying application of a layer sharing and distribution algorithm of a MIMO system in a base station, according to an embodiment.

Referring to FIG. 2, an operation in which the central scheduler 101 of the base station determines whether to apply the sharing and distribution algorithm will be described.

The central scheduler 101 may check a preset operation scenario in operation 200. The operation scenario may be determined when the base station is initially installed. The operator may set an operation scenario or change (update) the setting of the operation scenario, through a base station management network (not illustrating a connection with a base station management network in FIG. 1), which manages a plurality of base stations. For another example, when cells are expanded or reduced within a specific base station, the operator may update the operation scenario through the management network or change the operation scenario based on information preset in the central scheduler 101. In a case where no management network is used to change operational scenarios, when adding or subtracting cells from a base station, when cells are expanded or reduced within a base station, an operator who installs the equipment of the base station may update the setting of the operation scenario directly through the base station management interface (not shown in FIG. 1) at the site.

The operation scenario may be set differently for each cell. The first cell may be set so that the layer sharing and distribution algorithm is applied, the second cell may be set so that the layer sharing and distribution algorithm is not applied, and the Nth cell may be set so that the layer sharing and distribution algorithm is applied only when capacity limitation occurs. The above example is intended to aid understanding of the present disclosure and may be set for each cell in more various forms.

The operation scenario may be set based on the number of cells installed in the base station, the maximum number of UEs that can be processed in the base station, and the number of layers that can be utilized at the same time. In addition, the operation scenario is changed based on the number of changed cells when the base station cells are changed, such as expansion or reduction.

The central scheduler 101 may identify whether optimization of the check result of operation 200 is set in operation 210. As a result of checking in operation 210, if optimization is set in the operating scenario, the central scheduler 101 may proceed with operation 240.

On the other hand, if the check result optimization of the operation scenario is not set, the central scheduler 101 may identify whether conditional optimization is set in operation 220. The conditional optimization may be an operation of performing or determining not to perform optimization based on the limitation of the base station's processing capacity, such as the processing capacity of the processor or modem in the base station and the number of users or the amount of traffic in the current base station, and the like. Therefore, if conditional optimization is set, the central scheduler 101 may proceed to operation 230.

The central scheduler 101 may identify whether the optimization condition is satisfied in operation 230. For example, optimization may be required when the number of UEs in the base station is greater than the processing capacity of the processor or modem in the base station. In addition, when the UE is concentrated in a specific cell, optimization of the corresponding cell may be required. In this case, the central scheduler 101 may identify that optimization is required for the corresponding cell. That is, the above operation may be performed for each cell.

The central scheduler 101 may instruct the cell processing unit or the scheduler of the corresponding cell processing unit to apply the layer sharing and distribution algorithm when proceeding to operation 240. If necessary, the resource allocation setting of the modem 140 may be changed.

The central scheduler 101 may instruct the cell processing unit or the scheduler of the corresponding cell processing unit not to apply the layer sharing and distribution algorithm when proceeding to operation 250.

The operation of FIG. 2 described above may be performed in the central scheduler 101 periodically when the base station is driven, when a specific condition is satisfied, or periodically.

If it is determined that the application of the layer sharing and distribution algorithm is necessary in operation 240, the central scheduler 101 may provide information necessary when applying a layer sharing and distribution algorithm, by calculating the number of layers or the number of ranks required for MU-MIMO/SU-MIMO with a scheduler that manages each cell or multiple cells. The operation for calculating the required number of layers or the number of ranks may be considered in real-time or non-real-time. The real-time operation and the non-real-time operation will be further described below. A control may be performed based on the latest value according to a metric type of the operation for real-time/non-real-time operation, or performed by referring to all the values for the most recent period (time), or performed by using statistical values collected during base station operation, or performed by combining two or more described above.

On the other hand, the operation of FIG. 2 described above may be performed in the middle of the operations of the control flowchart to be described later, performed after the flowchart of FIG. 2, or performed after the operation of another flowchart.

Figure 3:
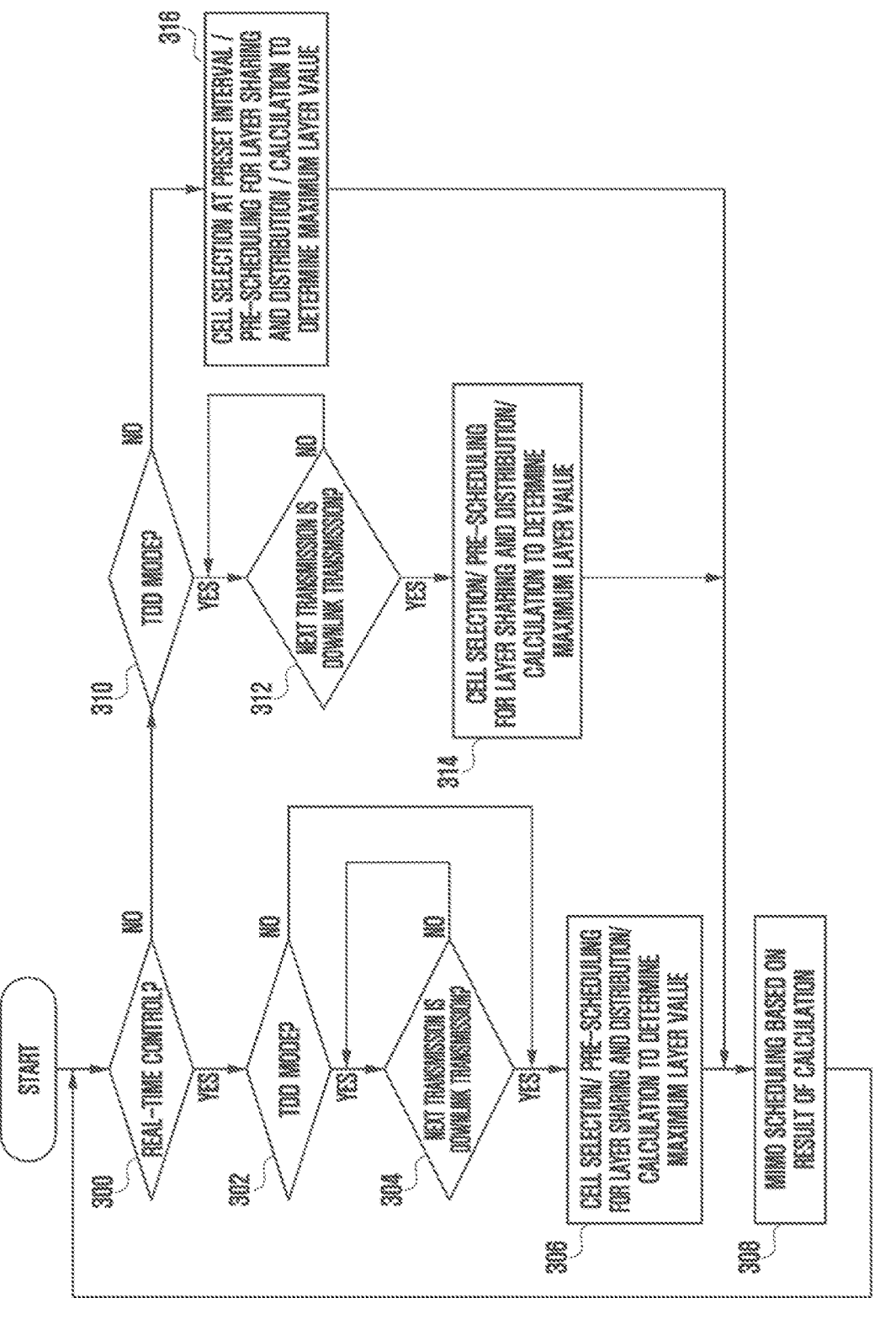
FIG. 3 is a control flowchart in case that a real-time/non-real-time layer sharing and distribution algorithm is applied according to an embodiment.

FIG. 3 is a control flowchart in case that a real-time/non-real-time layer sharing and distribution algorithm is applied according to an embodiment.

Prior to looking at FIG. 3, the present disclosure may be operated in each cell scheduler or operated in the central scheduler 101. Hereinafter, it is assumed that an operation performed in each cell scheduler is to be described. Hereinafter, an operation performed in each cell scheduler will be assumed and described. In addition, for convenience of description, an operation in the first cell scheduler 111 will be described as an example. However, those skilled in the art can apply the same even when operating in the second cell scheduler 121 and the Nth scheduler 131. In addition, the case where the operation is performed in the central scheduler 101 below will be further described separately.

Referring to FIG. 3, the first cell scheduler 111 may identify whether real-time control should be performed in operation 300. In the embodiment according to the present disclosure of FIG. 3, real-time control and non-real-time control are possible for the base station, which may be identified based on a value preset by the base station network operator. For example, as described in FIG. 2, the operator can set it up remotely through the base station management network, or use the value set when the base station was initially installed in a specific area, and it can also be set by an operator who installs when a specific cell of the base station is expanded (or reduced) or equipment is expanded (or reduced). In addition, as described above, the setting value of real-time control/non-real-time control may be updated as necessary in the base station management network. In addition, operation 300 is identified by the central scheduler 101 and provided to each cell scheduler (111, 121, . . . , 131).

As another example, a specific base station may be configured to perform only real-time control or may be configured to perform only non-real-time control. If configured to perform only real-time control or only non-real-time control, there may be no identifying operation of the operation 300.

Referring back to FIG. 3, the first cell scheduler 111 may proceed to operation 302 in case that real-time control is set as a result of the check in operation 300, and proceed to operation 310 in case that non-real-time control is set.

First, real-time control will be reviewed. The first cell scheduler 111 may identify whether the mode set in the base station is set in a time division duplex (TDD) scheme in operation 302. If the check result of operation 302 is set in the TDD scheme, the first cell scheduler 111 proceeds to operation 304. On the other hand, if it is not the TDD scheme, it may be a frequency division duplex (FDD) scheme. Therefore, if the check result in operation 302 is not the TDD scheme, the central scheduler 101 may proceed to operation 306.

First, if the TDD scheme is set, the first cell scheduler 111 may identify whether the next transmission is a downlink transmission in operation 304. For example, in the 3GPP standard, a plurality of TDD schemes are preset as TDD configuration information. According to the TDD configuration information, downlink transmission is performed in a specific slot or subframe, and uplink transmission may be performed in another slot or subframe. In describing the TDD/FDD schemes in the following description, slots or subframes may be used in combination, and all may be interpreted in the same meaning. Therefore, the first cell scheduler 111 may identify whether the next transmission is a downlink transmission based on the TDD configuration preset for the corresponding cell in operation 304. If the next transmission is not a downlink transmission in operation 304, the first cell scheduler 111 may wait until the next transmission is performed. Assume that the next transmission is an uplink transmission. For example, the current Mth slot may be uplink transmission, and the M+1th transmission may be uplink transmission. In this case, the first cell scheduler 111 may wait until the next slot. If the M+2-th slot, which is the next slot after the M+1-th slot, is downlink transmission, the first cell scheduler 111 may proceed to operation 306.

In an embodiment of the present disclosure, it has been described in slot or subframe units for the convenience of understanding, but in actual implementation, it may be a transmission time interval (TTI) unit, which is a unit in which a transport block (TB) is transmitted. Therefore, in the following embodiments, the slot or subframe may be understood by replacing it with a TTI.

In actual implementation, all transmission of downlinks after the next 2-3 slots in the current slot (regardless of uplink/downlink) may be scheduled. In this case, the base station may perform scheduling in advance based on information previously reserved for downlink transmission. Therefore, it may be based on an earlier slot (or TTI), in which all downlink transmission is determined, rather than determining in the immediately preceding slot (or TTI). For example, if the current slot is the Mth downlink slot and the M+2nd slot is the downlink slot and the transmission of the M+2nd downlink slot is all determined at this point (the Mth slot), the reference of operation 304 may be an M+2th slot instead of the next M+1 slot. Further explanation will be omitted since such modification may be appropriately modified by those skilled in the art as necessary.

If the next slot is a downlink slot or a FDD transfer in a TDD transfer, in operation 306, the first cell scheduler 111 may select a specific cell, perform pre-scheduling for layer sharing and distribution, and perform calculations to determine the maximum layer value. In other words, the first cell scheduler 111 may calculate a scheduling scheme in which the layer value is maximized to utilize the massive MIMO unit 114 to maximize transmission efficiency to UEs in a specific cell. Methods of pre-scheduling will be further described with reference to the drawings to be described later. This operation may apply scheduling to additionally distribute a layer to a major cell (a cell mainly used) in case that a specific UE frequently performs handover from one cell to another cell. This allows the UE to adaptively receive services without any special handover procedure.

Meanwhile, the cell selection is displayed in operation 306 of FIG. 3 to explain a case in which control is performed by the central scheduler 101. That is, the central scheduler 101 may select each cell and perform the above operation on the corresponding cell. In this way, the central scheduler 101 may perform scheduling to have a maximum layer value and then provide the determined scheduling information to the schedulers (111, 121, . . . , 131) of the corresponding cell.

Hereinafter, an operation performed by the first cell scheduler 111 will be assumed and described again. After that, the first cell scheduler 111 may proceed to operation 308 and perform scheduling of the massive MIMO unit 114 based on scheduling information determined to have a maximum layer value based on pre-scheduling in operation 306.

Next, non-real-time control will be described. Since the first cell scheduler 111 is a non-real-time control if it is not a real-time control in operation 300, the first cell scheduler 111 may identify whether the current cell setting is a TDD mode in operation 310. In case of the TDD mode as a result of the check in operation 310, the first cell scheduler 111 may proceed to operation 312 to identify whether the next transmission is a downlink transmission. Even here, it may be determined at an earlier timing rather than the next transmission. Since this deformation has been described above, no further description will be given.

Since it is a non-real-time control, the first cell scheduler 111 may wait until the next transmission becomes a downlink in case that the next transmission is not a downlink transmission in operation 312. In case that the next transmission is a downlink transmission, the first cell scheduler 111 may perform a calculation for determining the maximum layer value based on pre-scheduling for layer sharing and distribution in operation 314. In this case, the operation for sharing and distributing layers in non-real-time may be determined based on the maximum number of layers or the number of ranks that can be used. In addition, since the present disclosure is a non-real-time method, it is considered to perform it once in a certain period or in a necessary situation. The non-real-time layer pooling operation must maintain the maximum number of MIMO layers once determined for a certain period of time. For example, when changes in the wireless environment and/or the movement (moving speed) of the UE do not change rapidly, and/or when it is difficult to apply the real-time scheme due to computational processing constraints, the non-real-time method may be applied.

On the other hand, if a certain UE frequently handover from one cell to another cell through operation 314, scheduling may be applied to distribute additional layer to a major cell (a cells mainly used). This allows the UE to adaptively receive services without any special handover procedure.

Thereafter, when operation 314 is completed, the first cell scheduler 111 may proceed to operation 308. Since operation 308 has been described above, further description will be omitted.

In addition, the cell selection is displayed in operation 312 of FIG. 3 to explain a case in which control is performed by the central scheduler 101. In other words, the central scheduler 101 may select each cell and perform the above operation on the corresponding cell. As such, the central scheduler 101 may perform scheduling to have a maximum layer value and then provide the determined scheduling information to the schedulers (111, 121, . . . , 131) of the corresponding cell.

Meanwhile, when the check result of operation 310 is not all of the TDDs, the first cell scheduler 111 may proceed to operation 316. On the other hand, it is in FDD mode in case that all of the check results of operation 310 are not TDD, the first cell scheduler 111 may proceed to operation 316. In operation 316, the first cell scheduler 111 may perform pre-scheduling for layer sharing and distribution at predetermined intervals and determine scheduling having a maximum layer value. When the scheduling scheme having the maximum layer value is determined in this way, operation 308 may be performed. Since operation 308 has been described above, additional descriptions will be omitted.

On the other hand, if a certain UE frequently handover from one cell to another cell through operation 314, scheduling may be applied to additionally distribute layers to a major cell (a cell that are mainly used). This allows the UE to adaptively receive services without any special handover procedure.

In addition, the cell selection is displayed in operation 362 of FIG. 3 to explain a case in which control is performed by the central scheduler 101. That is, the central scheduler 101 may select each cell and perform the above operation on the corresponding cell. In this way, the central scheduler 101 may perform scheduling to have a maximum layer value, and then provide the determined scheduling information to the scheduler (111, 121, . . . , 131) of the corresponding cell.

On the other hand, if the operation of FIG. 3 described above is preset to perform real-time control or non-real-time operation in the operation scenario described in FIG. 2, it may be implemented without operation 300. In addition, operations 302 and 310 may be unnecessary operations in case that the operating scenario described in operation 200 of FIG. 2 is preset as the FDD mode or the TDD mode, in respect of whether the base station is in the TDD mode or the FDD mode.

On the other hand, the operation of FIG. 3 described above may be performed separately from the operation of FIG. 2, or the operation of FIG. 3 may be performed after the operation of FIG. 2 is first performed. In addition, if the optimization scenario of FIG. 2 is changed, the operation of FIG. 2 may be performed in the middle of FIG. 3. Therefore, if a layer sharing and distribution algorithm is applied to a specific cell and a layer sharing and distribution algorithm is not applied to another specific cell, the flowchart of FIG. 3 may only be performed when the layer sharing and distribution algorithm is set to be applied.

Figure 4A:
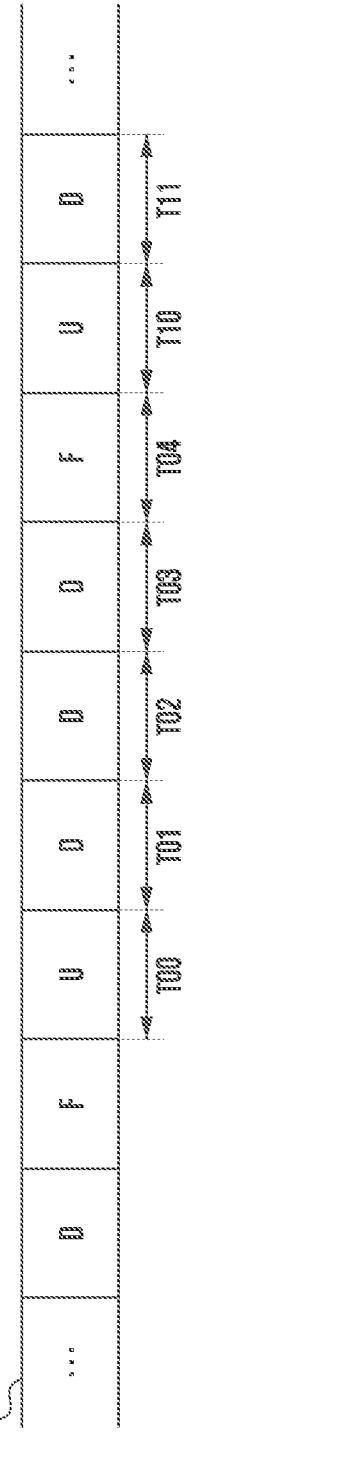
FIG. 4A is an exemplary diagram illustrating a timing for scheduling a massive MIMO unit in a TDD mode according to an embodiment.
Figure 4B:
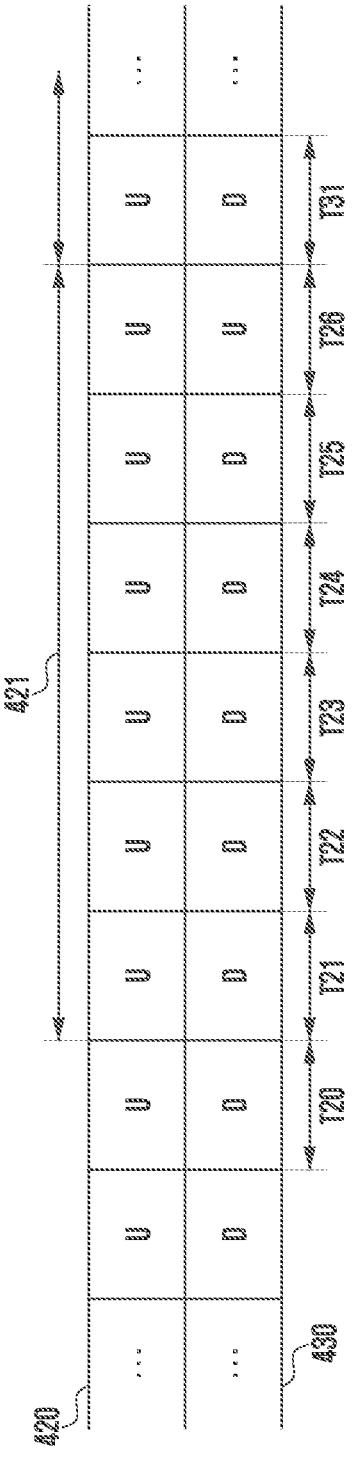
FIG. 4B is an exemplary diagram illustrating a timing for scheduling a massive MIMO unit in an FDD mode according to an embodiment.

FIG. 4A is an exemplary diagram illustrating a timing for scheduling a massive MIMO unit in a TDD mode according to an embodiment, and FIG. 4B is an exemplary diagram illustrating a timing for scheduling a massive MIMO unit in an FDD mode according to an embodiment.

Referring to FIG. 4A, reference numeral 410 is a configuration according to an example of a TDD configuration. A slot of T00 refers to an uplink, frames of T01, T02, and T03 are downlink slots, a slot of T04 is an F slot, a slot of T10 is an uplink slot, and T11 illustrates a downlink slot.

The operation of the non-real-time mode in the first cell scheduler 111 will be first described with reference to FIG. 4A. The first cell scheduler 111 may identify whether the next transmission is a downlink transmission as in operation 312 at the timing of T00. Since the next transmission is a downlink transmission, the first cell scheduler 111 may perform pre-scheduling for layer sharing and distribution in the downlink transmission of T01, T02, and T03, and determine (calculate) the scheduling of the corresponding cell to have the maximum layer value based on the pre-scheduling. Accordingly, downlink transmission may be performed in downlink slots of T01, T02, and T03 in a scheduling method determined at the timing of T00. Thereafter, the scheduling may be performed at the uplink transmission time of T10, which is a slot just before T11 at which the downlink starts at the time when the scheduling is performed. In this way, if the downlink slots continuously have multiple slots, it may be determined to be the maximum MIMO layer to be applied to the slots. In this way, since two or more downlinks alternate after one or two or more uplinks in the TDD scheme, the change timing of the uplink/downlink may be set as one period. In addition, in consideration of the load of calculation and/or changes in the wireless environment and/or the movement (moving speed) of the UE, one period or two or more periods according to the TDD configuration may be used as a downlink scheduling change unit.

However, if the non-real-time scheme is used in the TDD scheme, since the UE is serviced in an updated MIMO layer scheme before a relatively long time, performance degradation may occur. For example, it may be assumed that the results of applying a method according to the present disclosure are updated to suit a wireless environment in which cell 1 serves many UEs with maximum layer and cell 2 to 4 serves a small number of UEs with minimum layer. In this case, since the wireless environment may change within the period in which scheduling is performed according to the MIMO layer scheduling results according to the present disclosure, a case in which maximum performance can be guaranteed only when cell 3 operates the maximum layer may occur. When the situation changes like this, if scheduling is performed according to the MIMO layer scheduling results in a non-real-time scheme, the overall performance of the base station may be degraded.

As described above, a period value should be appropriately set to reduce the occurrence of performance degradation. Alternatively, it may be implemented to periodically detect whether performance degradation occurs in a specific cell within a specific period or whether MIMO layer scheduling should be changed, and to change the scheduling according to the detected results. It may be desirable to consider additional changes in such scheduling by the central scheduler 101. For monitoring of the entire base station, the central scheduler 101 may periodically obtain scheduling information from each cell scheduler (111, 121, . . . , 131) to identify whether the MIMO layer scheduling should be changed. In another way, in a case of having a separate area for storing scheduling information for each cell in the memory, the central scheduler 101 may directly obtain scheduling information stored for each cell from the memory to identify whether the MIMO layer scheduling should be changed.

In addition, when controlling MIMO layer scheduling in a non-real-time scheme, it may further have additional steps to monitor the change of the MIMO layer scheduling scheme in the first cell scheduler 111 or the central scheduler 101 after operation 314. If additional MIMO layer scheduling is required according to the monitoring result, operation 314 may be performed.

Referring to FIG. 4B, an uplink frame 420 and a downlink frame 430 are illustrated in an FDD scheme. In the FDD scheme, since uplink and downlink are performed simultaneously using different frequency resources, there is no downlink/uplink switching as shown in FIG. 4A. Accordingly, an operator may set a certain period 421 in advance. Such a period may be determined by experiments for each region or may be set to one specific value in advance. The period setting may use various methods, and there is no restriction on the period setting method in the present disclosure.

First, a control operation in the first cell scheduler 111 will be described. The first cell scheduler 111 may be in a state in which modem resources for MIMO layer scheduling are previously allocated from the central scheduler 101. The modem resource may be allocated by the central scheduler 101 to each cell scheduler in advance based on scheduling information including at least one of the load of the entire base station, the number of UEs, the amount of traffic, the guaranteed transmission rate for each cell, and the wireless environment for each cell.

The timing of performing operation 316 of the first cell scheduler 111 may be a timing of T20. The slot of the T20 may perform a MIMO layer schedule for downlink transmission in the next period 421. The above scheduling is equivalent to operation 316, as described above, period may be set in consideration of the load of calculation and/or changes in the wireless environment and/or the movement (moving speed) of the UE. In addition, the calculation may be performed in consideration of the number of layers or the number of ranks within the calculation.

Unlike the TDD scheme, the FDD scheme may be relatively free to set the period in a non-real-time scheme. Therefore, it may be possible to change the period value in consideration of the time zone and region. For example, in the middle of the night when people rarely move, the central scheduler 101 of the base station may set the period to a relatively long time compared to the daytime. In addition, since it may be considered that there is little movement even in an area where people are sparse, a base station installed in such the area may set a relatively long period of time.

On the other hand, if the long period is set, performance degradation may occur because the UE is serviced by the MIMO layer scheme updated a long time ago, in case that a specific high-speed mobile user exists or a large number of people are suddenly and instantaneously rushed. Therefore, a method for detecting this may be necessary. For example, the central scheduler 101 of the base station may identify a surge in the number of UEs in a specific cell in the event of the above situation, or obtain a sudden increase in the movement speed of UE using scheduling information. Accordingly, the scheduling information may include not only the number of UEs but also movement speed information of UEs.

In this way, if a sudden increase in UE in a specific cell and/or a sudden increase in UE movement speed in a specific cell, the central scheduler 101 may change the period value and allocate more resources of the modem 140 to the corresponding cell.

Next, the real-time scheme will be described.

A real-time control in a TDD mode will be described with reference to FIG. 4A. The first cell scheduler 111 may identify whether the next transmission is a downlink transmission in operation 304. For example, the next slot in which the current timing is a slot of T00 may be the downlink transmission. In addition, even if the current timing is timing T01 and T02, the next slot may be the downlink transmission. However, if the current timing is timing T03 or T04, the next slot corresponds to a case where downlink transmission is not. Accordingly, in operation 304, the first cell scheduler 111 may proceed to operation 306 if the next transmission is the downlink transmission. If the next transmission is not the downlink transmission, operation 304 may be repeatedly performed.

When proceeding to operation 306, the first cell scheduler 111 may perform pre-scheduling for layer sharing and distribution for the next transmission and determine a scheduling scheme with a maximum layer based on the pre-scheduling. Even in a real-time scheme, the maximum number of layers or ranks that can be used in the next downlink slot may be determined. This determination may be made for each slot (or subframe or TTI), which is a scheduling unit, and may correspond only to the case where the next transmission is downlink in the TDD scheme.

Next, real-time control in the FDD mode will be described with reference to FIG. 4B. The first cell scheduler 111 immediately performs operation 306. This is because in the case of the FDD mode, the downlink and the uplink are separated by frequency resources, as illustrated in FIG. 4B. Accordingly, in the FDD mode, operation 306 may be performed for each slot (or subframe or TTI). As described above, operation 306 may be an operation of performing pre-scheduling for layer sharing and distribution and determining a scheduling scheme with a maximum layer based on the pre-scheduling.

Next, metrics for distributing a layer to each cell according to various embodiments of the present invention will be described.

Hereinafter, five metrics will be described.

(1) Metric According to Pre-Scheduling Scheme

A metric according to the pre-scheduling scheme is a metric used to calculate the pre-scheduled layer for each cell and distribute the layer for each cell. For example, in multi-user MIMO, the pre-scheduled layer may identify performance indicators by pre-calculating which UEs should be bundled and how many layers should be transmitted at the same time to increase performance. In addition, in single-user MIMO, it is possible to predict how many layers will be transmitted to a single UE to obtain performance gains through layer. Which UE is to be actually selected may be identified through the channel environment of the UE, for example, signal to interference noise ratio (SINR) indicating the received signal field, modulation and coding scheme level (MCS-level), channel quality indicator (CQI) indicating channel quality, and the like. In addition, the value of the proportional fair (PF) point of view of the UE may be additionally used. For example, it may be a scheme that increases the probability that a UE with a high PF and a high channel electric field value is selected.

In an embodiment of the pre-scheduling scheme, when determining the pre-scheduled layer of the UE to be serviced based on multi-user MIMO, interference between UEs may be identified in advance and will be reflected. In other words, it is a scheme that manages channel information between UE and base station in advance and selects only UEs that can increase performance among UEs in case that there is a large interference between UEs selected as multi-user MIMO. It is possible to predict more accurate layer distribution values in real time by accurately determining the performance loss caused by interference between UEs and performing layer distribution. However, this method has high computational complexity. Therefore, when periodically predicting the bundle of pre-scheduled layers and UEs and distributing layers by cell in order to prevent high complexity in advance, layer distribution may be considered so that there is no or minimal performance loss due to interference between UEs.

(2) Sum PF/Cell (w/o MU Loss)

The sum metric of proportional fair (PF) per cell is a scheme for allocating more layers to a cell in which the sum of PF values of UEs to be scheduled for each cell is greater. Therefore, the central scheduler 101 may calculate the sum of PFs for each cell and sort cells having the highest PF values in descending order. Thereafter, more layers are allocated at a preset ratio or a ratio based on the sum of PFs for cells sorted in descending order. Accordingly, the central scheduler 101 may distribute the resources of the modem 140 according to the PF sum.

In the present disclosure, the meaning that the PF sum is momentarily large may be interpreted as requiring more data to be transmitted from the corresponding cell. Therefore, the central scheduler may allocate more layers to a cell with a larger PF value in the layer distribution value. In addition, both the PF sum or average value are confirmed, and more layers may be distributed to cells with high PF sum and average values. As another example, by utilizing the standard deviation and/or variance values in consideration with the time distribution and PF distribution of different UEs in the cell, the central scheduler 101 may distribute fewer layers when the variance value is large, and may distribute many layers when the variance value is small. In case that standard deviation or variance is used, layers may be distributed using a preset threshold. For example, when the variance value is greater than the preset first threshold value, between the first threshold value and the second threshold value, and the variance value is less than the third threshold value, layer distribution ratio may be respectively determined. Although three thresholds have been described as an example in the present disclosure, one or two thresholds may be used, or four or more thresholds may be used.

The meaning that the standard deviation/variance of the PF described above is large may be interpreted as meaning that only a part of UEs are likely to be selected. In addition, if the standard deviation/variance is small and the average value is high, it may be interpreted that all terminals require data traffic evenly. Accordingly, at least one or more other threshold values may be considered for the average value.

(3) Metrics According to the Number of UE Indicators

The metric according to the number of UEs is the scheme monitoring the number of scheduling target UEs or call connected UEs for each cell, and allocating more layers when the value is large. The call-connected UE may attach to a base station through a RACH procedure, include a UE of an idle state, a UE of an active state, or refer to only UEs in an active state in some cases. A UE in an idle state does not always request data traffic, but data traffic may be requested while layer distribution is periodically performed. A UE in an idle state does not always request data traffic, but data traffic may be requested while layer distribution is periodically performed. In this case, compared to a method of checking only the number of UEs subject to scheduling at the corresponding timing, it is easy to correspond to data traffic that will suddenly explode in a method of determining by metric, including the call-connected UE, that is, the UE of the idle state.

In addition, for the scheduling target UEs, not all UEs may require a MIMO transmission scheme For example, a UE that receives a message such as RRC signaling may not transmit data using a plurality of layers, usually spatially, for reception performance stability. Similar to the example of the above call access terminal, that is, idle state UE, in case of considering both the number of scheduling UEs and the number of MIMO scheduling UEs (including multi-user, single user), it is easy to correspond to rapidly changing data traffic conditions.

(4) Metric Using at Least One Indicator of CQI/PMI/RI

Metrics using at least one indicator of CQI/PMI/RI may allocate more layer resources to cells in which better channel information is distributed, by checking the instantaneous distribution or statistics of the downlink channel indicators measured by the UE and reported to the base station. In general, channel indicators may be represented in various ways such as CQI, PMI, and RI, and in particular, it may be determined that the higher the CQI or RI indicators, the more layer resources may be used. Therefore, since the better the downlink channel situation the UE experienced in a particular cell, the more likely it is to achieve higher performance when servicing data traffic, it may be determined that more layer resources are allocated.

In a case of the PMI indicator, the UE may derive the most preferred precoding matrix, and a value of the matrix may vary depending on the number of RIs. In order to increase performance by using a lot of layer resources in the base station, the most ideal performance may be obtained when there is little interference between UEs or between MIMO layers (i.e., when considered at the orthogonal channel level). At this time, the base station may determine how highly correlated the preferred precoding codebook is between UEs by checking the PMI indicators of each of the UEs, and determine that only the UE with a high RI among the two UEs will receive actual data traffic when the base station has a high PMI association between UEs. In other words, if the PMI association is high, it may be inferred that a combination with high interference between UEs will be formed when it is bundled and scheduled with multi-user MIMO, and determined that the layer required by the cell is not high. On the contrary, if the PMI association between UEs is low, it may be inferred that interference is low and serviceable with orthogonal channels when scheduling by grouping with multi-user MIMO, and determined that the layer required by the cell is high.

(5) Base Station Statistics Indicator Metric

A base station statistics indicator metric is a scheme that divides layers for each cell by referring to MIMO-scheduled layers or data throughput statistics. Since the statistics indicators are changed and updated over a long-term period of several seconds to several hours, there is the point of view to utilize the base station statistical indicator metric using an average value. Therefore, the base station statistics indicator metric may not be suitable when layer distribution is determined in real time or in a short-term period.

In addition, a scheme that checks a physical resource block (PRB) usage ratio of a corresponding cell and allocates more layers to a cell having a high PRB usage ratio on statistical indicators may be considered. The method of considering the PRB usage ratio may be used when all corresponding cells are determined to be congested in the long-term view, and may require short-term supplementation because layer distribution resources are concentrated on one side from a short-term point of view, and performance of other cells may deteriorate. To determine whether a specific cell requires a high layer in the short term, a scheme that considers a metric using at least one of the described CQI/PMI/RI indicators together with statistical indicators in combination may be possible.

When each metric described above is summarized in a table, it may be summarized as shown in Table 1 below.

TABLE 1

| Metric Type | Metric Type | Importance |
|---|---|---|
| Pre-scheduled layer | The result obtained by calculating MIMO scheduled layers or layers determined by multi-user bundling. | High |
| Sum PF/cell | Sum of PFs of all UEs in cell | High |
| Metric related to the number of UEs | The number of MIMO scheduled UEs or The number of UEs to be serviced by MIMO. | Middle |
| CQI-related metric | CQI reporting statistical metric | Middle |
| PMI-related metric | CQI reporting statistical metric | Middle |
| base station statistical metric | PRB usage in Cell DL throughout | Low |

Figure 5:
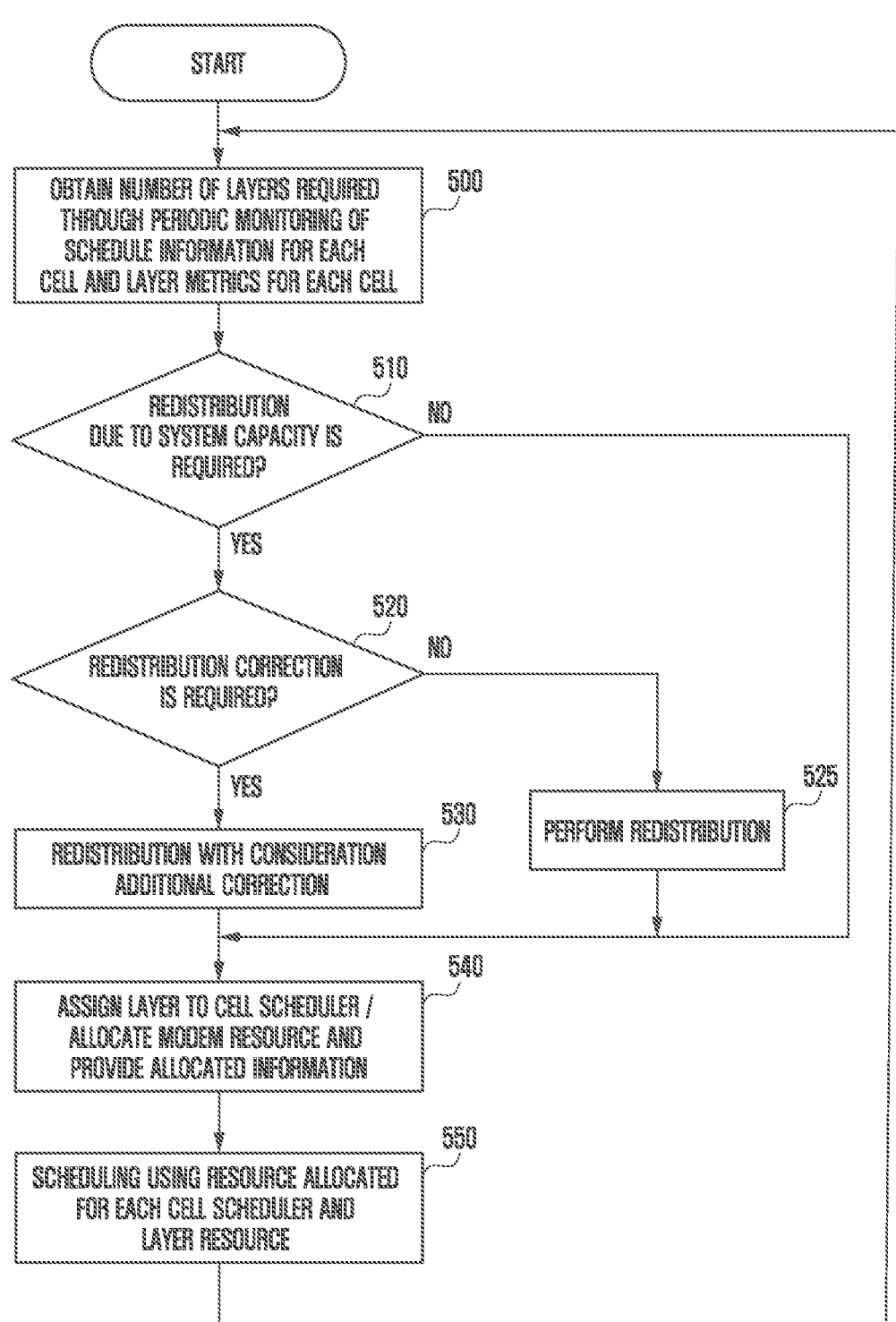
FIG. 5 is a control flowchart for determining base station layer resource distribution according to an embodiment.

FIG. 5 is a control flowchart for determining base station layer resource distribution according to an embodiment.

The embodiment of FIG. 5 illustrates the operation of the central scheduler 101 and the operation of each cell scheduler 111, 121, 131 together, and they will be separately described in the following description.

In operation 500, the central scheduler 101 may periodically monitor scheduling information for each cell and obtain the number of layers required through a layer metric to be applied for each cell. For example, if using the first metric among the five metrics described above, it can be assumed that the number of layers required for the first cell is A, the number of layers required for the second cell is B, the number of layers required in the third cell is C, and the number of layers required in the Nth cell is D. The central scheduler 101 may calculate the number of layers required for each cell using at least one of the above-described metrics.

Thereafter, the central scheduler 101 may identify whether redistribution is necessary due to system capacity by using the sum of the number of layers calculated for each cell in operation 510. For example, in case that the total number of layers required for each cell is X and the number of layers that can be provided by the base station is Y, the central scheduler 101 may have excessive or insufficient resources in the system. In operation 510, it is identified whether such shortage or surplus resources occur. In addition, when there are surplus resources, a preset threshold value may be used as to whether additional resources should be allocated. For example, if there are few or no surplus resources that can be allocated additionally, there may be no need to allocate additional resources. Therefore, it is possible to identify whether additional resource allocation is to be performed using a threshold value to identify this case.

As a result of the check in operation 510, the central scheduler 101 may proceed to operation 520 if redistribution is necessary, and may proceed to operation 540 if redistribution is not required.

In addition, in some cases, when redistribution is required in operation 510, the central scheduler 101 may first perform operation 525, which will be described later, and then perform operation 520. In this case, if the check result of operation 520 does not require recalibration, operation 540 may be immediately performed without performing operation 525.

In addition, in operation 520, the central scheduler 101 may check whether additional correction is required during redistribution. Additional correction may be performed in case that a difference between layers required for each cell is large. For example, there may be a case where the base station has three or more cells, the number of layers required for the first cell corresponds to about 50% of the entire system of the base station, and the number of layers required for the remaining cells is less than 50%. In this way, in case that the number of layers required in the first cell is quite large, it may be determined whether to reduce or enlarge the layers in the same ratio according to the layer level required in the first cell and the layer level required in the other cells, or to reduce or enlarge the total number of layers to be similar.

The central scheduler 101 may proceed to 530 operation if redistribution correction is required in 520 operation, and may proceed to 525 operation if redistribution correction is not required.

First, proceeding to operation 525, the central scheduler 101 may only perform redistribution according to system capacity. For example, if the number of layers that can be processed in the system using the difference between X and Y calculated in operation 510 is exceeded, the base station needs to readjust the number of layers for each cell. In this case, redistribution may be performed to reduce the number of layers for each cell using an unused metric among the above 5 metrics. As another example, there may be a case where the difference between X and Y that can be processed by the base station system is a positive number, and the value of the difference between the positive numbers is greater than a preset threshold value. That is, it may be the case that a lot of capacity remains in the base station system. In this case, the central scheduler 101 may additionally allocate a layer, and correct to additionally allocate a layer by correcting some of the values to at least one of the five metrics described above, either a previously unused metric or a used metric(s).

Meanwhile, when the process proceeds from operation 520 to operation 530, the central scheduler 101 may perform redistribution in consideration of additional correction. For example, as described above when reducing or additionally allocating layers for each cell, layer redistribution may be performed by considering whether to reduce or add layers at the same rate as the number of layers required or to reduce or add layers so that each cell has a similar layer.

And then, the central scheduler 101 may allocate layer and modem resources to the scheduler for each cell, and provide information on the allocated resources. That is, the central scheduler 101 can provide layer information and modem resource allocation information allocated to the first cell to the first cell scheduler 111, and provide layer information allocated to the second cell and modem resource allocation information to the second cell scheduler 121 in the same way.

Then, each cell scheduler (111, 121, ..., 131) can allocate (schedule) resources to the UE using allocated resources and layer resources, and transmit data traffic to the downlink through this.

Next, operation optimization between MU-/SU-MIMO will be described based on the operation of FIG. 5.

As described above, the layer required for each cell may be determined using at least one metric, and the number of layers required for each cell determined based on the metric may be similar for each cell (small standard deviation), or the number of layers required for each cell may vary significantly (large standard deviation). Therefore, there may be a performance limitation of the cell until the cell allocated a small layer is allocated a large number of layers again. For example, it is difficult for a cell allocated with only layer 2 to achieve a high data throughput of layer 4 or higher even if a specific UE has a high PF or high data traffic. Therefore, a method for such supplementation may be required.

Through the embodiments described below, in the case where asymmetry occurs in the layers allocated to each cell by layer distribution, various solutions will be examined to determine which operating cell is to be restricted first.

The first method is to first restrict SU-MIMO. In the first method, a cell allocated with a small number of layers can be serviced with only a few layers even with SU-MIMO, and a cell allocated with many layers can obtain higher performance with MU-MIMO. Therefore, if the layer distribution allocation is correctly performed, an advantage can be obtained by using a scheme that first restricts SU-MIMO in terms of the total performance of each cell.

Conversely, the second method is to first restrict MU-MIMO. The second scheme may be seen to ensure minimum peak performance of SU-MIMO. Therefore, even if the layer determination metric that first restricts SU-MIMO is high, it is possible to prevent the minimum performance from being too low by guaranteeing the minimum performance of other cells without allocating a high layer. However, since layer distribution allocation may be focused on fair results, it may be degraded from the point of view of total cell performance.

The third method may be a method of performing optimization by balancing both SU-MIMO/MU-MIMO. According to the present disclosure, it is possible only by considering the above-described metrics in a complex manner. In an embodiment, if the PF standard deviation is large even when the number of UEs is large, SU-MIMO performance may be guaranteed, and if the number of UEs is large, the pre-scheduled layer is high, and the PF standard deviation is small, MU-MIMO performance may be guaranteed. The third method can be considered as a method for stably obtaining minimum/maximum performance by determining more complexly. Therefore, the third method can be advantageous when a complex determination is required because the data traffic distribution or UE movement between cells installed in the scheduler is active.

The operation of FIG. 5 described above may include both the case where the layer sharing and distribution algorithm according to the layer setting is applied and the case where the layer sharing and distribution algorithm is not applied in FIG. 2 described above, and may be applied only to cells to which the layer sharing and distribution algorithms are applied.

Figure 6A:
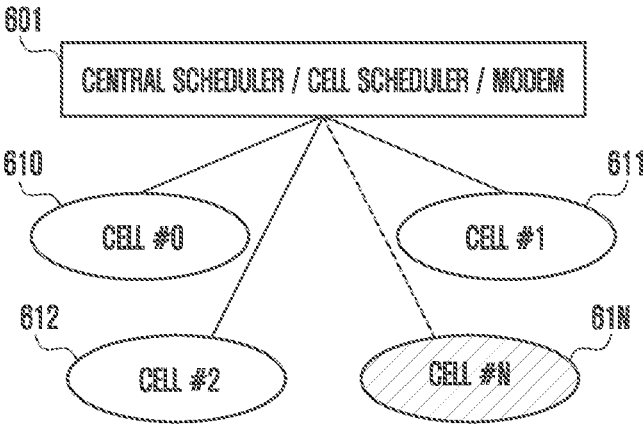
FIGS. 6A and 6B are exemplary diagrams for explaining an operation of extending a new cell according to an embodiment.
Figure 6B:
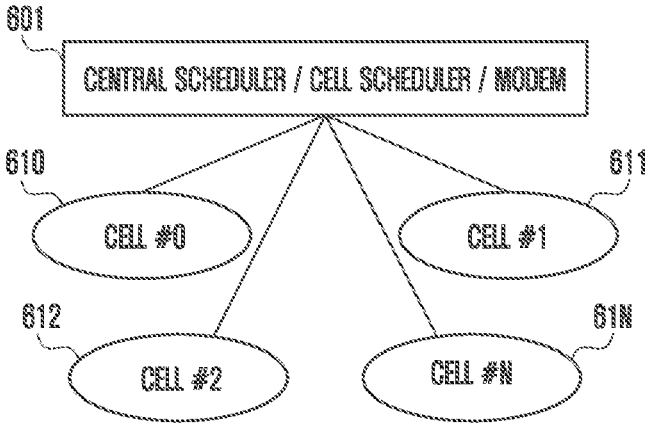
Figure 6C:
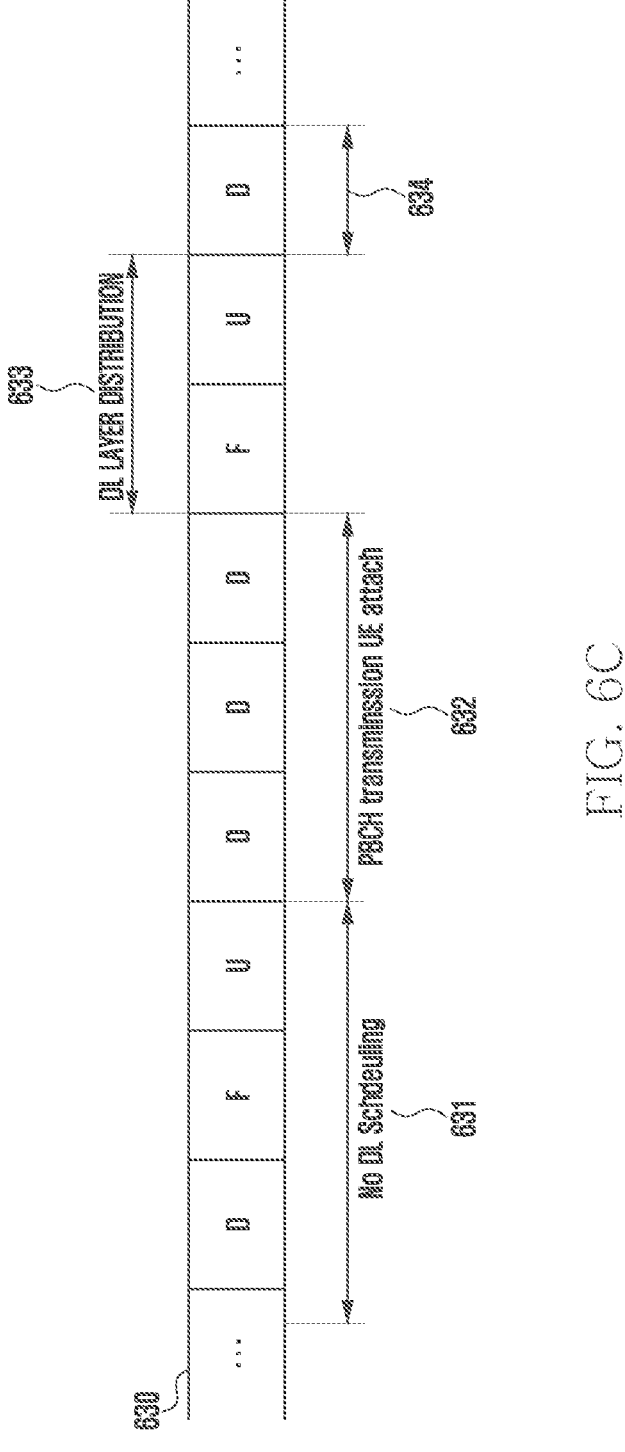
FIG. 6C is a timing diagram illustrating an operation in which a layer is allocated to a cell in a TDD mode when a new cell is expanded according to an embodiment.

FIGS. 6A and 6B are exemplary diagrams for explaining an operation of extending a new cell according to an embodiment, and FIG. 6C is a timing diagram illustrating an operation in which a layer is allocated to a cell in a TDD mode when a new cell is expanded according to an embodiment.

First, referring to FIG. 6A, the central scheduler/cell scheduler/modem 601 is illustrated as one module. In addition, the cells may be cells in which cell #0 610, cell #1 611, cell #2 612 . . . are previously installed, and cell #N 61N is newly installed. Therefore, the cell #N 61N is displayed by inserting Hatching to identify the newly installed cell.

Referring to FIG. 6B, a state in which the cell #N 61N is driven is illustrated. Accordingly, the base station illustrated in FIG. 6B may be in a state in which cell #0 610, cell #1 611, cell #2 612, . . . , and cell #N 61N are all driven.

This will be described again based on the time flow with reference to FIG. 6C. In FIG. 6C, a case of using a TDD scheme is illustrated, and subframes 630 according to a TDD configuration are illustrated. When the cell #N 61N is initially installed, scheduling may be performed so that no data may be transmitted to the cell #N 61N in an interval of reference numeral 631. Thereafter, the specific downlink subframes 632 may transmit a broadcast signal to a specific channel, for example, PBCH. In addition, a reference signal (RS) may be transmitted from the corresponding subframes 632.

First, in interval 631, transmission may be performed only with {1, 2, . . . , N–1}, which is a set of cells that have been previously expanded. Therefore, in interval 631, it may be determined that existing cells are using all base station resources. Therefore, the newly expanded cell #N 61N is in a state in which no data can be transmitted. Thereafter, resources capable of transmitting a broadcast signal and/or a reference signal may be allocated by the central scheduler 101 at a specific timing. Accordingly, the cell #N 61N may transmit a PBCH to transmit a broadcast signal in the 632 interval, and the UE may perform an attach procedure based on this. If a new UE is attached based on the broadcast signal, a change in the number of UEs located in each cell and a change in the number of layers required may occur. Therefore, based on the above information, the central scheduler/cell scheduler/modem 601 may allocate resources to cell #N 61N and determine layer distribution according to the scheme described above. The operation in which the layer distribution is performed may be performed in the interval 633. Thereafter, the cell #N 61N may transmit data traffic to the UE from the interval 634 based on the distribution in the interval 633.

On the other hand, the embodiments disclosed in the present specification and drawings described above are only specific examples for easy explanation and understanding of the present invention, and are not intended to limit the scope of the present invention. Therefore, the scope of this invention should be interpreted as including all changes or modifications derived based on the technical idea of this invention in addition to the embodiments disclosed herein.

Embodiments provided herein may be used when the base station of the mobile communication system distributes the layer of the MIMO system.

The invention claimed is:

1. A method performed by a base station, the method comprising:
obtaining scheduling information for a plurality of cells supported by the base station;
determining a total number of layers for the plurality of cells using the scheduling information and a first layer metric;
in accordance with a determination that the total number of layers exceeds the number of layers supported by the base station, reducing the total number of layers using a second layer metric different from the first layer metric;
in accordance with a determination that the total number of layers is less than or equal to the number of layers supported by the base station, increasing the total number of layers using the second layer metric;
performing downlink scheduling based on the total number of layers; and
transmitting data based on the downlink scheduling.

2. The method of claim 1,
wherein the number of layers supported by the base station corresponds to a processing capacity of the base station.

3. The method of claim 1, further comprising:
determining a layer for each cell based on a sum of a proportional fair (PF) values of user equipments (UEs).

4. The method of claim 1, further comprising:
determining a layer for each cell based on a number of UEs connected for each cell of the plurality of cells.

5. The method of claim 1, further comprising:
determining a layer for each cell of the plurality of cells according to channel information.

6. The method of claim 1, further comprising:
determining a layer for each cell using a temporal statistical indicator of the base station.

7. The method of claim 1, further comprising:
identifying whether an additional correction is required after the redistributing; and
performing, in response to the additional correction being required, the additional correction.

8. The method of claim 1,
wherein a first layer of a plurality of layers in a first cell of the plurality of cells corresponds to a first stream of first data transmitted to a first UE,
wherein a second layer of the plurality of layers corresponds to a second stream of second data transmitted to a second UE, and
wherein the plurality of UEs comprises the first UE and the second UE.

9. The method of claim 8, further comprising:
determining the number of layers for the first cell based on first channel conditions at the first cell, a first velocity of the first UE, and a second velocity of the second UE.

10. The method of claim 9, wherein the first channel conditions comprises a signal to interference noise ratio (SINR) indicating the received signal field at the first UE, a modulation and coding scheme level (MCS-level) used by the first UE, and/or a channel quality indicator (CQI) indicating channel quality observed by the first UE.

11. A base station comprising:

at least one transceiver;

memory; and at least one processor, wherein the at least one processor is configured to:

obtain scheduling information for a plurality of cells supported by the base station;

determine a total number of layers for the plurality of cells using the scheduling information and a first layer metric;

in accordance with a determination that the total number of layers exceeds the number of layers supported by the base station, reduce the total number of layers using a second layer metric different from the first layer metric;

in accordance with a determination that the total number of layers is less than or equal to the number of layers supported by the base station, increase the total number of layers using the second layer metric;

perform downlink scheduling based on the total number of layers; and transmit data based on the downlink scheduling.

12. The base station of claim 11, wherein the number of layers supported by the base station corresponds to a processing capacity of the base station.

13. The base station of claim 11, wherein the at least one processor is configured to:

determine a layer for each cell based on sum of a proportional fair (PF) values of user equipments (UEs).

14. The base station of claim 11, wherein the at least one processor is configured to:

determine a layer for each cell based on a number of the UEs connected for each cell of the plurality of cells.

15. The base station of claim 11, wherein the at least one processor is configured to:

determine a layer for each cell is based on channel information for each cell of the plurality of cells.

16. The base station of claim 11, wherein the at least one processor is configured to:

determine a layer for each cell based on a temporal statistical indicator of the base station.

17. The base station of claim 11, wherein the at least one processor is configured to:

identify whether an additional correction is required for the adding or reducing the number of layers; and perform, responsive to the additional correction being required, the additional correction.

* * * * *